US012554729B2

(12) United States Patent
Lee et al.

(10) Patent No.: US 12,554,729 B2
(45) Date of Patent: Feb. 17, 2026

(54) ELECTRONIC DEVICE AND DEVICE FUNCTION SEARCH METHOD THEREOF

(71) Applicant: ASUSTek COMPUTER INC., Taipei (TW)

(72) Inventors: Yi-Nan Lee, Taipei (TW); Shih-Chieh Liao, Taipei (TW); Chin-Hao Chang, Taipei (TW); Shih-Chuan Chiu, Taipei (TW); Tzu-Hung Chuang, Taipei (TW); Chia-Hao Kang, Taipei (TW); Wei-Cheng Chen, Taipei (TW); Shin-Yi Huang, Taipei (TW); Tsung Huai Mou, Taipei (TW); Wen-Tsong Lu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 18/928,198

(22) Filed: Oct. 28, 2024

(65) Prior Publication Data

US 2025/0156428 A1 May 15, 2025

(30) Foreign Application Priority Data

Nov. 15, 2023 (TW) ................................. 112144022

(51) Int. Cl.
*G06F 17/00* (2019.01)
*G06F 7/00* (2006.01)
*G06F 16/242* (2019.01)
*G06F 16/2457* (2019.01)

(52) U.S. Cl.
CPC ...... *G06F 16/24578* (2019.01); *G06F 16/243* (2019.01)

(58) Field of Classification Search
CPC .......................... G06F 16/24578; G06F 16/243
USPC ........................................................... 707/728
See application file for complete search history.

(56) References Cited

U.S. PATENT DOCUMENTS

| 8,688,727 | B1 * | 4/2014 | Das | G06F 16/24575 |
| | | | | 707/766 |
| 10,185,748 | B1 * | 1/2019 | Ayzenshtat | G06F 16/248 |
| 10,331,785 | B2 * | 6/2019 | Arthur | G06F 40/30 |
| 11,093,488 | B1 * | 8/2021 | Perkins | G06F 16/243 |

(Continued)

FOREIGN PATENT DOCUMENTS

| CN | 106372054 | 2/2017 |
| CN | 110442874 | 11/2019 |

(Continued)

*Primary Examiner* — Pavan Mamillapalli
(74) *Attorney, Agent, or Firm* — JCIPRNET

(57) ABSTRACT

An electronic device and a device function search method thereof are provided. The method is adapted for the electronic device having a plurality of functions and includes the following steps. A search query is obtained through an input device. A first semantic feature vector of the search query is generated by using a natural language model. Semantic similarity between the first semantic feature vector of the search query and at least one second semantic feature vector of each function is determined. A search result corresponding to the search query is determined according to the semantic similarity between the first semantic feature vector of the search query and the at least one second semantic feature vector of each of the functions. The search result includes at least one of the functions.

9 Claims, 4 Drawing Sheets

(56) References Cited

U.S. PATENT DOCUMENTS

| | | | | |
|---|---|---|---|---|
| 12,008,026 | B1* | 6/2024 | Sanz | G06F 16/3347 |
| 2014/0244631 | A1* | 8/2014 | Arthur | G06F 16/43 |
| | | | | 707/723 |
| 2019/0278813 | A1* | 9/2019 | Venugopal | G06F 16/951 |
| 2020/0050207 | A1* | 2/2020 | Huber | G06F 18/2413 |
| 2023/0325358 | A1* | 10/2023 | Mohajer | G10L 15/063 |
| | | | | 707/723 |

FOREIGN PATENT DOCUMENTS

| | | |
|---|---|---|
| CN | 111709249 | 9/2020 |
| TW | I227417 | 2/2005 |

* cited by examiner

ELECTRONIC DEVICE AND DEVICE FUNCTION SEARCH METHOD THEREOF

CROSS-REFERENCE TO RELATED APPLICATION

This application claims the priority benefit of Taiwan application serial no. 112144022, filed on Nov. 15, 2023. The entirety of the above-mentioned patent application is hereby incorporated by reference herein and made a part of this specification.

BACKGROUND

Technical Field

This disclosure relates to an electronic device and a device function search method thereof.

Description of Related Art

With the advancement of technology, some of the current electronic devices have function-search functions, so that users may search for a desired function by entering keywords. However, when users would like to search for an internal function of electronic devices, they need to accurately enter relevant keywords so as to find the desired function. Since the users may not be familiar with the exact name of the function, they often need to spend time trying to enter multiple keywords before they may find the desired function, or the desired function cannot even be found. In addition, various device manufacturers may name similar functions in different ways, which requires users to try multiple different keywords to find desired functions.

SUMMARY

The disclosure provides a device function search method, adapted for an electronic device having a plurality of functions. The method includes the following steps. A search query is obtained through an input device. A first semantic feature vector of the search query is generated by using a natural language model. Semantic similarity between the first semantic feature vector of the search query and at least one second semantic feature vector of each of the functions is determined. A search result corresponding to the search query is determined according to the semantic similarity between the first semantic feature vector of the search query and the at least one second semantic feature vector of each of the functions. The search result includes at least one of the functions.

The disclosure provides an electronic device including an input device, a storage device and a processor. The processor is coupled to the input device and the storage device, and the storage device records a plurality of instructions. The processor performs the following operations by being configured to execute the instructions. A search query is obtained through the input device. The first semantic feature vector of the search query is generated by using a natural language model. Semantic similarity is determined between the first semantic feature vector of the search query and at least one second semantic feature vector of each of a plurality of functions. A search result corresponding to the search query is determined according to the semantic similarity between the first semantic feature vector of the search query and the at least one second semantic feature vector of each of the plurality of functions, and the search result comprises at least one of the plurality of functions.

Based on the above, in an embodiment of the disclosure, the natural language model may be used to generate the first semantic feature vector of the search query, and semantic similarity may be obtained by comparing the first semantic feature vector of the search query with the second semantic feature vector corresponding to each of the functions. Therefore, the search result of the search query may be determined according to the semantic similarity, and at least one of the plurality of functions is provided as the search result of the search query. In this way, even if the user does not enter the function name accurately for search, the desired function that meets the user's expectation may still be found, thereby greatly improving the convenience and flexibility of function search.

To make the disclosure more comprehensible, embodiments will be described in detail below with reference to the accompanying drawings.

DESCRIPTION OF THE EMBODIMENTS

Figure 1:
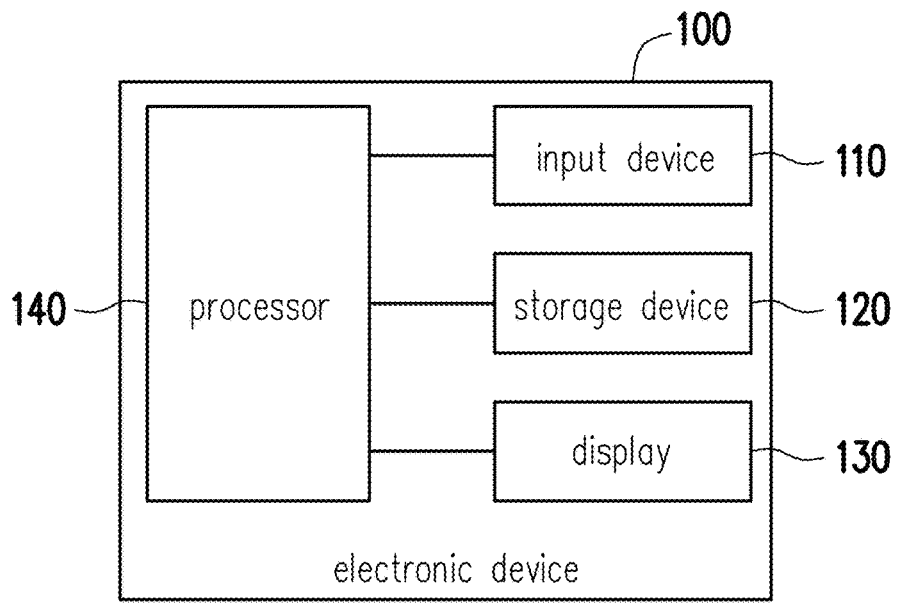
FIG. 1 is a block diagram of an electronic device according to an embodiment of the disclosure.

Some embodiments of the disclosure will be described in detail with reference to the drawings. For the stated reference numerals in the following description, the same reference numerals are regarded to be referring to the same or similar elements when appearing in different drawings. The embodiments are only a part of the disclosure and do not disclose all possible implementation manners of the disclosure. More specifically, the embodiments are only examples within the scope of the claims of the disclosure.

Referring to FIG. 1, in this embodiment, the electronic device 100 may include an input device 110, a storage device 120, a display 130 and a processor 140. The electronic device 100 may be a smartphone, a laptop, a tablet, a desktop computer, or a smart wearable device, etc., but the disclosure is not limited thereto.

The input device 110 is used to receive a user's input and is, for example, a touch input device, a keyboard or a microphone, etc., but the disclosure is not limited thereto. In the embodiment, the input device 110 may be used to receive the search query input by the user.

The storage device 120 is used to store data and software modules (such as operating systems, applications or drivers) for access by the processor 140, and is, for example, any type of fixed or removable random access memory (RAM), read-only memory (ROM), flash memory, hard disk, or a combination thereof.

The display 130 is, for example, a liquid crystal display (LCD), a light-emitting diode (LED) display, an organic light-emitting diode (OLED) display or other types of displays, but the disclosure is not limited thereto. In the embodiment, the display 130 may display a user operation interface for receiving the search query, and may also display the search result.

The processor 140 is coupled to the input device 110, the storage device 120 and the display 130. The processor 140 is, for example, a central processing unit (CPU), an application processor (AP), or other programmable general-purpose or special-purpose microprocessors, a digital signal processor (DSP), an image signal processor (ISP), a graphics processing unit (GPU) or other similar devices, integrated circuits and a combination thereof. The processor 140 may access and execute the software modules recorded in the storage device 120 to achieve the device function search method in the embodiment of the disclosure. The software modules may be broadly construed as mean instructions, instruction sets, codes, programming codes, programs, applications, software packages, threads, programs, functions, etc., regardless of whether they are referred to as software, firmware, intermediate software, micro-codes, hardware description languages, or others.

In the embodiment, the electronic device 100 may have a plurality of functions. For example, these functions may include call settings function, network settings function, display settings function, application function, battery settings function, privacy settings function, camera settings function, or other functions available for the user to set or operate. The disclosure does not limit the types of functions, and the functions that the electronic device 100 may provide to the user are all within the scope of the disclosure. When the user inputs a search query, the electronic device 100 may provide a search result including one or more recommended functions, so that the user does not need to search for desired functions by repeatedly browsing through layers of operation interfaces.

Figure 2:
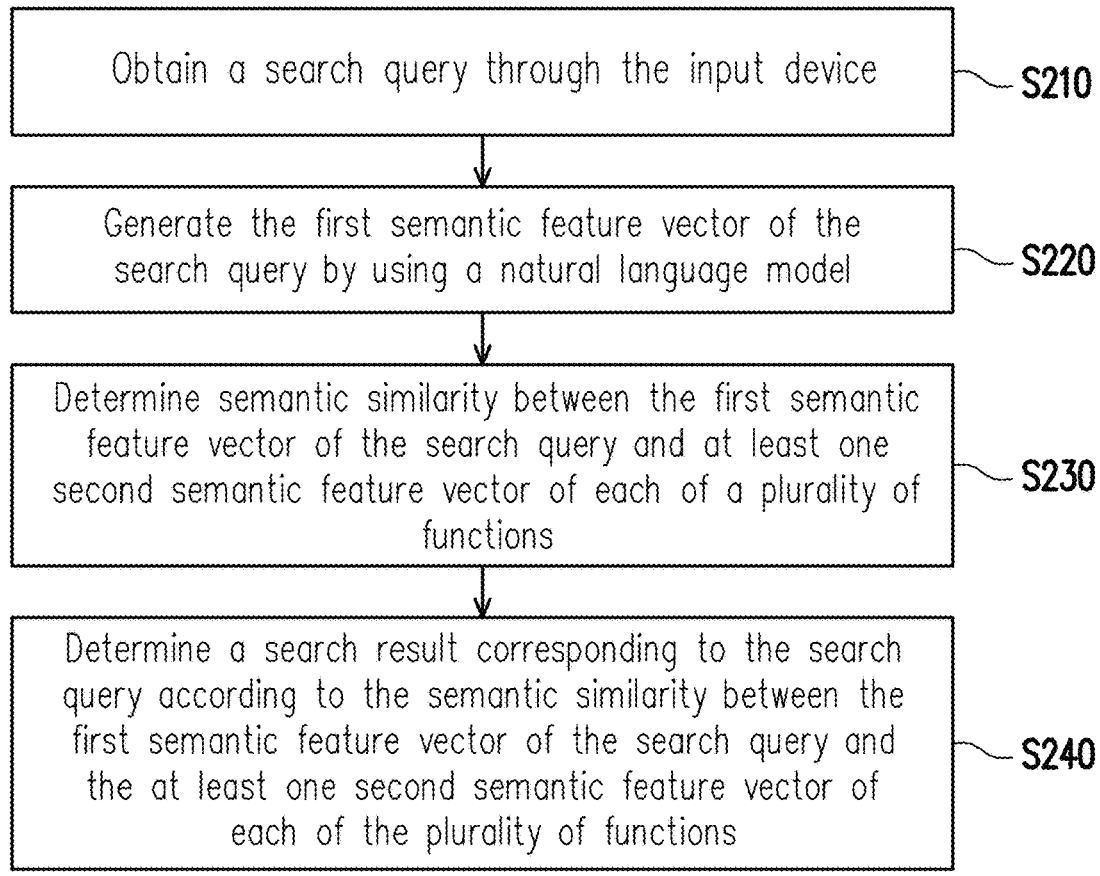
FIG. 2 is a flow chart of a device function search method according to an embodiment of the disclosure.

Referring to FIG. 1 and FIG. 2, the method in the embodiment is adapted for the electronic device 100. The following are the detailed steps of the device function search method of the embodiment, with reference to the components of the electronic device 100. To clearly illustrate possible implementation of the disclosure, the following illustration will be accompanied by FIG. 3. Please refer to FIG. 1 and FIG. 2 with FIG. 3.

In step S210, the processor 140 obtains a search query QS1 through the input device 110. For example, the user may use the input device 110 to input the search query QS1 in the input field of the user operation interface displayed by the display 130. Alternatively, the user may speak the search query QS1, and processor 140 may receive voice input through input device 110. The search query QS1 may include one word or multiple words, and the disclosure is not limited thereto.

In step S220, the processor 140 generates a first semantic feature vector SF1 of the search query QS1 by using a natural language model M1. Specifically, in the semantic analysis operation 32, the processor 140 may input the search query QS1 into the natural language model M1, so that the natural language model M1 outputs the first semantic feature vector SF1 of the search query QS1.

In some embodiments, the natural language model M1 may include a BERT (Bidirectional Encoder Representations from Transformers) model, but the disclosure is not limited thereto. The natural language model M1 is generated from pre-training with a large number of texts of multiple languages. The machine learning method of the natural language model M1 may be self-supervised masked learning, that is, using a Masked Language Model (MLM) for model training so that natural language model M1 may learn to understand the semantics of the input text. The trained natural language model M1 may output a semantic feature vector of the input text in the multi-dimensional feature space according to the input text (i.e., the search query QS1). The model parameters of the trained natural language model M1 may be recorded in the storage device 120. In some embodiments, the processor 140 may also fine-tune the natural language model M1 by using relevant texts about the plurality of functions of the electronic device 100.

In some embodiments, the processor 140 may create an initial natural language model, wherein the weight parameters of the initial natural language model are floating-point numbers. Next, the processor 140 quantizes the weight parameters of the initial natural language model into corresponding integers to obtain the natural language model M1. The initial natural language model may be a pre-trained natural language model or a fine-tuned natural language model, and the disclosure is not limited thereto. For example, processor 140 may convert each weight parameter which is originally a floating-point number into an integer by performing a rounding operation or a truncation operation on each weight parameter in the initial natural language model, so as to obtain the natural language model M whose weight parameters are all integers. The above-mentioned rounding operation may include rounding off or rounding down, etc. In other words, the weight parameters of the initial natural language model may be mapped to corresponding integers within a certain range. In this way, the storage space, execution memory space and model processing time of the natural language model M1 may be reduced.

In step S230, the processor 140 determines the semantic similarity between the first semantic feature vector SF1 of the search query QS1 and at least one second semantic feature vector SF2 of each of the functions. Specifically, each of the functions of the electronic device 100 is also associated with one or more second semantic feature vectors SF2. In some embodiments, the processor 140 may calculate the semantic similarity between the first semantic feature vector SF1 of the search query QS1 and each second semantic feature vector SF2 of each of the functions. For example, the processor 140 may calculate cosine similarity, Euclidean Distance, or Manhattan Distance between the first semantic feature vector SF1 and the second semantic feature vector SF2 to generate the semantic similarity between two semantic feature vectors.

Figure 3:
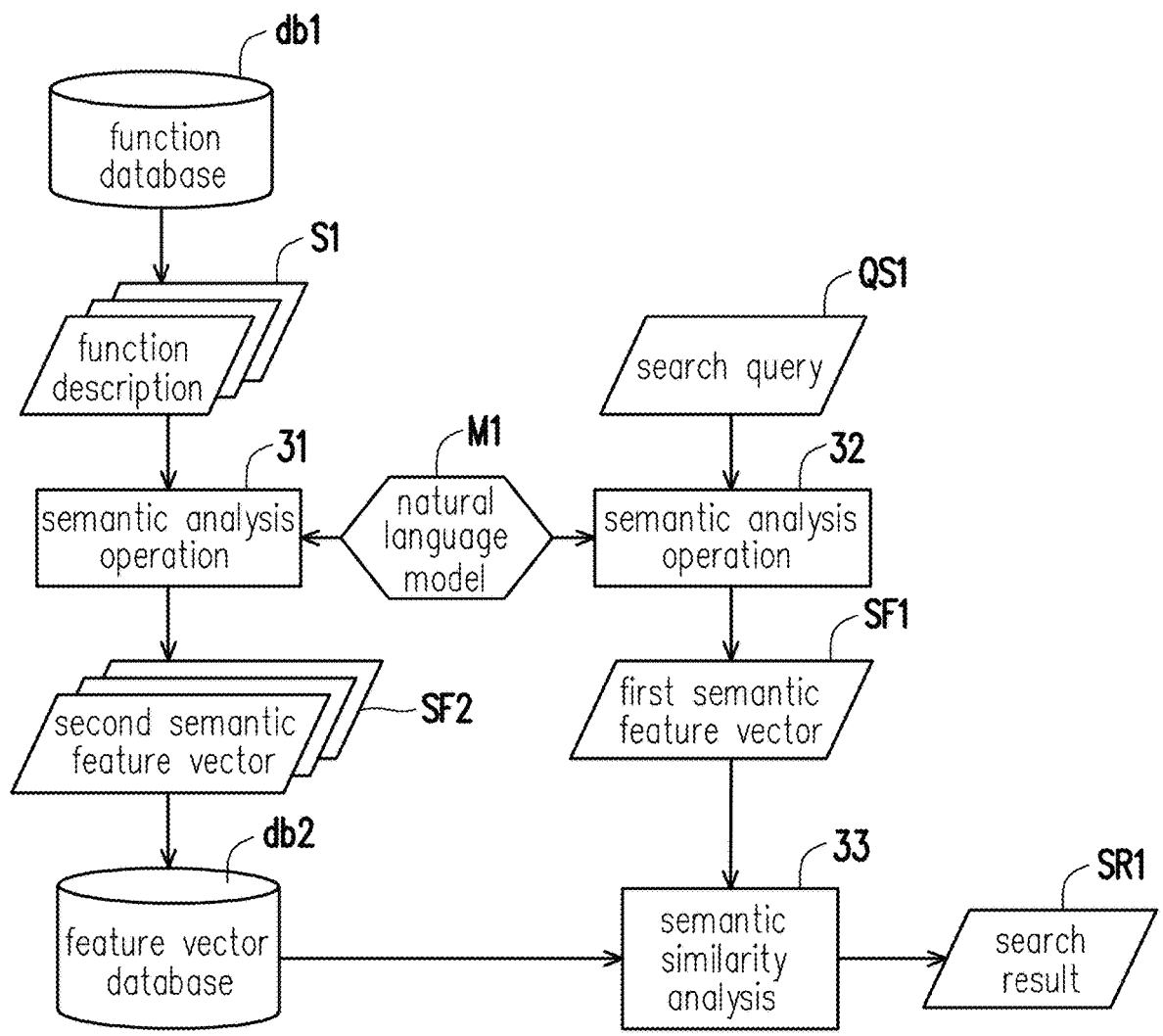
FIG. 3 is a schematic diagram of a device function search method according to an embodiment of the disclosure.

It should be noted that the second semantic feature vector SF2 of each of the functions may also be generated by the natural language model M1. As shown in FIG. 3, a function database db1 may record one or more function descriptions S1 for each of the functions. The function description S1 is, for example, a function name or a function feature string. In a semantic analysis operation 31, the processor 140 may input each function description S1 of each of the functions into the natural language model M1, so that the natural language model M1 outputs the second semantic feature vector SF2 of each function description S1 of each of the functions. Afterwards, one or more second semantic feature vectors SF2 for each of the functions may be recorded to a feature vector database db2. It can be seen that when a function records N function descriptions S1 related to the plurality of functions in the function database db1, the feature vector database db2 records N second semantic feature vectors SF2 corresponding to the N function descriptions S1, respectively, wherein N is an integer greater than 0.

In step S240, the processor 140 determines a search result SR1 corresponding to the search query QS1 according to the semantic similarity between the first semantic feature vector SF1 of the search query QS1 and at least one second semantic feature vector SF2 of each of the functions. The search result SR1 includes at least one of the plurality of functions. Specifically, according to the semantic similarity between the first semantic feature vector SF1 and each second semantic feature vector SF2 of each of the functions, the processor 140 may identify, from the feature vector database db2, some of the second semantic feature vectors SF2 that are semantically close to the semantics of the first semantic feature vector SF1. For example, the processor 140 may filter out recommended functions as the search result SR1 by preset threshold filtering or semantic similarity sorting.

It is worth mentioning that the function description S1 in the function database db1 may be flexibly defined. In addition to the function name, the function description S1 in the function database db1 may also include a function feature string that is close to public perception and idioms. Therefore, through the use of natural language model M1, even if the user does not enter the search query QS1 that is exactly the same as the function name or keyword, the processor 140 may still search for a function that meets the user's need according to the semantics of the search query QS1. In this way, through the use of natural language model M1, there is no need to set a large number of keywords for each of the functions, and the processor 140 may still understand the semantics of search query QS1 and provide the search result SR1 that meets the user's need.

Figure 4:
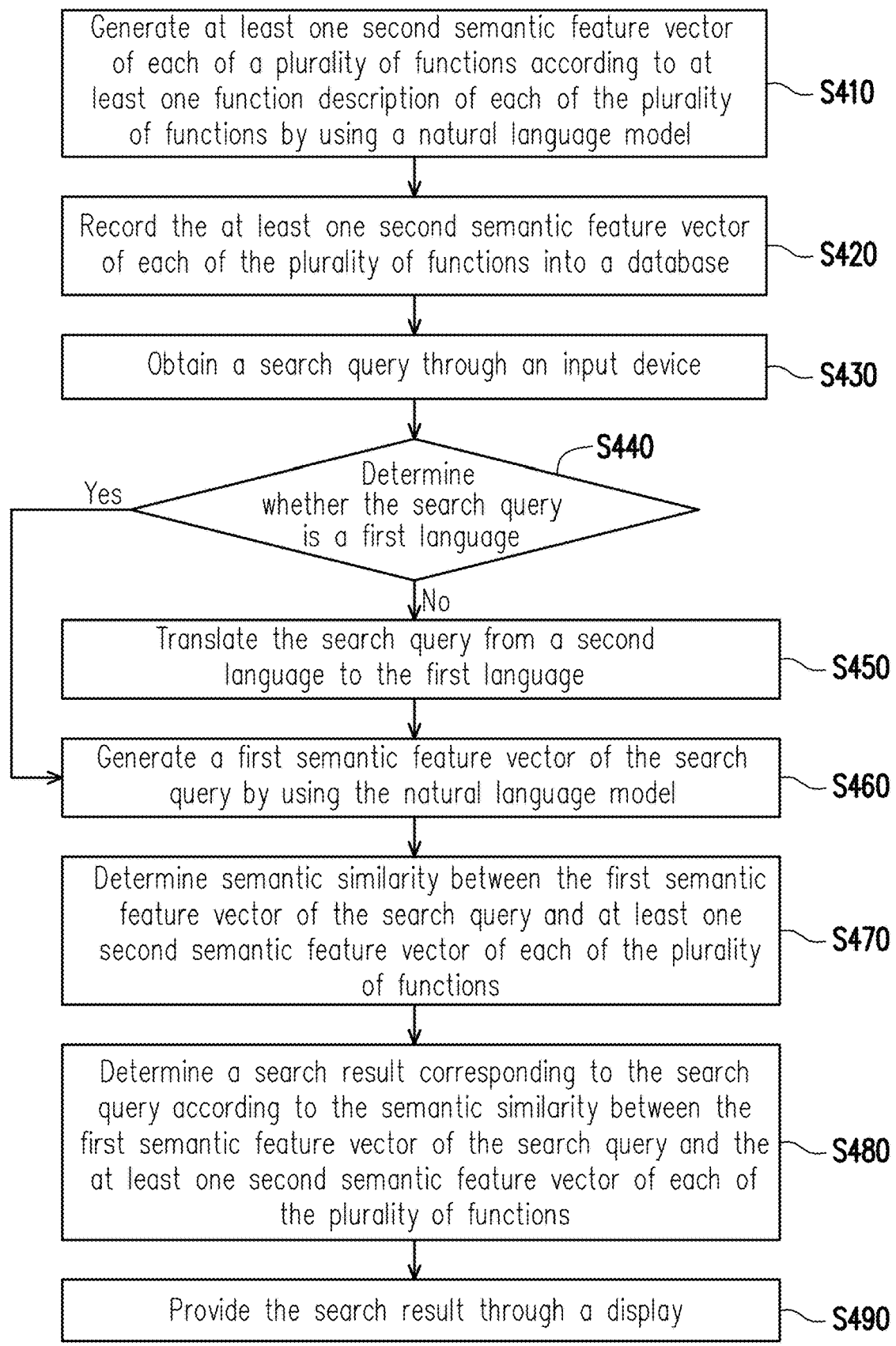
FIG. 4 is a flow chart of a device function search method according to an embodiment of the disclosure.

Referring to FIG. 1 and FIG. 4, the method of the embodiment is adapted for the electronic device 100. The following are the detailed steps of the device function search method of the embodiment, with reference to the components of the electronic device 100.

In step S410, the processor 140 generates at least one second semantic feature vector of each of the functions according to at least one function description of each of the functions by using the natural language model. The function description may include a function name and a function feature string. The function feature string is a string that is different from the function name and is used to describe the content of a function. The processor 140 may generate one or more second semantic feature vectors corresponding to one or more function descriptions of each of the functions. The function feature string of a certain function may also include one or more keywords about the function.

In some embodiments, the plurality of functions of the electronic device 100 may include a first function. The processor 140 may input the first function name of the first function into the natural language model to generate one of at least one second semantic feature vector of the first function. The processor 140 may input the function feature string of the first function into the natural language model to generate another one of the at least one second semantic feature vector of the first function. For example, Table 1 is a feature list of the second semantic feature vectors of the plurality of functions.

TABLE 1

| Function | Function description | Second semantic feature vector |
| --- | --- | --- |
| function A | function name A1 | semantic feature vector V1 |
| | function feature string S1 | semantic feature vector V2 |
| | function feature string S2 | semantic feature vector V3 |
| function B | function name B1 | semantic feature vector V4 |
| | function feature string S3 | semantic feature vector V5 |

TABLE 1-continued

| Function | Function description | Second semantic feature vector |
| --- | --- | --- |
| | function feature string S4 | semantic feature vector V6 |
| ... | ... | ... |

As shown in Table 1, the "function A" may correspond to the second semantic feature vectors V1 to V3 based on the "function name A1", the "function feature string S1" and the "function feature string S2." Similarly, the "function B" may correspond to the second semantic feature vectors V4 to V6 based on the "function name B1," the "function feature string S3" and the "function feature string S4."

It should be noted that in some embodiments, the function feature string of the first function is the first language, and the search query is the first language or the second language, and the first language is different from the second language. Further, the processor 140 may generate a second semantic feature vector according to the first function name and the function feature string of the first language. However, the search query may be in the first language or in a second language that is different from the first language. For example, the second semantic feature vector of the first function may be generated according to an English function description, but the first semantic feature vector may be generated based on a Chinese search query.

In some embodiments, the processor 140 may first translate the search query into the first language, and then generate the second semantic feature vector according to the search query in the first language. Or, in another embodiment, the processor 140 may directly generate the second semantic feature vector according to the search query of the second language. That is, even if the language of the search query is different from the function name or function feature string that generates the second semantic feature vector, the processor 140 may still generate a search result that matches the semantics of the search query, based on the multi-language understanding ability of the natural language model.

In some embodiments, the processor 140 may also input the second function name of the first function into the natural language model to generate another one of at least a second semantic feature vector of the first function. The first function name above is the first language, and the second function name above is the second language. For example, Table 2 is a feature list of the second semantic feature vectors of the plurality of functions. The "function name A1" and the "function name B1" may be in English, and the "function name A2" and the "function name B2" may be in a language other than English, such as Chinese or Japanese, etc.

TABLE 2

| Function | Function description | Second semantic feature vector |
| --- | --- | --- |
| function A | function name A1 | semantic feature vector V1 |
| | function name A2 | semantic feature vector V7 |
| | function feature string S1 | semantic feature vector V2 |
| | function feature string S2 | semantic feature vector V3 |
| function B | function name B1 | semantic feature vector V4 |
| | function name B2 | semantic feature vector V8 |
| | function feature string S3 | semantic feature vector V5 |
| | function feature string S4 | semantic feature vector V6 |
| ... | ... | ... |

As shown in Table 2, the "function A" may correspond to the second semantic feature vector V7 based on the "function name A2." In the same way, the "function B" may correspond to the second semantic feature vector V8 based on the "function name B2." That is, a certain function may generate multiple second semantic features based on function names in different languages.

In step S420, the processor 140 records the at least one second semantic feature vector of each of the functions into the database (for example, the feature vector database db2 shown in FIG. 3). In step S430, the processor 140 obtains a search query through the input device 110. The above steps have been illustrated in the previous embodiment and will not be illustrated again here.

In step S440, the processor 140 determines whether the search query is the first language. If the determination in step S440 is "No," the processor 140 translates the search query from the second language to the first language in step S450. For example, processor 140 may translate the search query from the second language to the first language through an offline translation function. Thereafter, the processor 140 may generate a first semantic feature vector according to the search query translated into the first language. For some specific languages, implementing this translation step may increase the chance of successful searches.

In step S460, the processor 140 generates the first semantic feature vector of the search query by using the natural language model. It can be seen that the processor 140 may generate the first semantic feature vector according to the search query of the first language. In step S470, the processor 140 determines the semantic similarity between the first semantic feature vector of the search query and the at least one second semantic feature vector of each of the functions.

In step S480, the processor 140 determines the search result corresponding to the search query according to the semantic similarity between the first semantic feature vector of the search query and the at least one second semantic feature vector of each of the functions.

Figure 5:
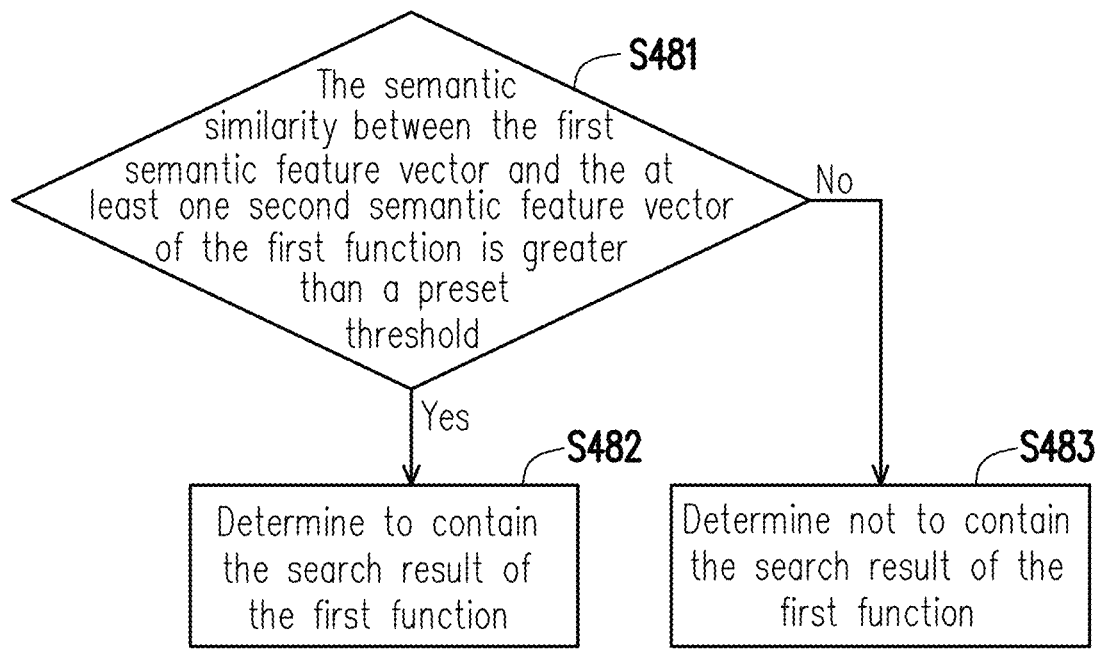
FIG. 5 is a flowchart of determining a search result according to an embodiment of the disclosure.

Referring to FIG. 5, in some embodiments, step S480 may be implemented as steps S481 to S483. In step S481, the processor 140 determines whether the semantic similarity between the first semantic feature vector and the at least one second semantic feature vector of the first function is greater than a preset threshold. The preset threshold may be set based on actual needs, and the disclosure does not limit the type of the preset threshold. Taking Table 2 as an example, the processor 140 may respectively determine whether the semantic similarity between the first semantic feature vector and the second semantic feature vectors V1 to V8 is greater than the preset threshold.

If the determination in step S481 is "Yes," continue to step S482. In step S482, when the semantic similarity between the first semantic feature vector and the at least one second semantic feature vector of the first function is greater than the preset threshold, the processor 140 determines to contain the search result of the first function. That is to say, when the semantic similarity between the second semantic feature vector and the first semantic feature vector of a certain function is greater than the preset threshold, the processor 140 may regard the function as a recommended function and include it in the search result.

Otherwise, if the determination in step S481 is "No," continue to step S483. In step S483, when the semantic similarity between the first semantic feature vector and the at least one second semantic feature vector of the first function is not greater than the preset threshold, the processor 140 determine not to contain the search result of the first function. That is to say, when the semantic similarity between the second semantic feature vector and the first semantic feature vector of a certain function is less than the preset threshold, the processor 140 may exclude the function as a recommended function and not include it in the search result.

Figure 6:
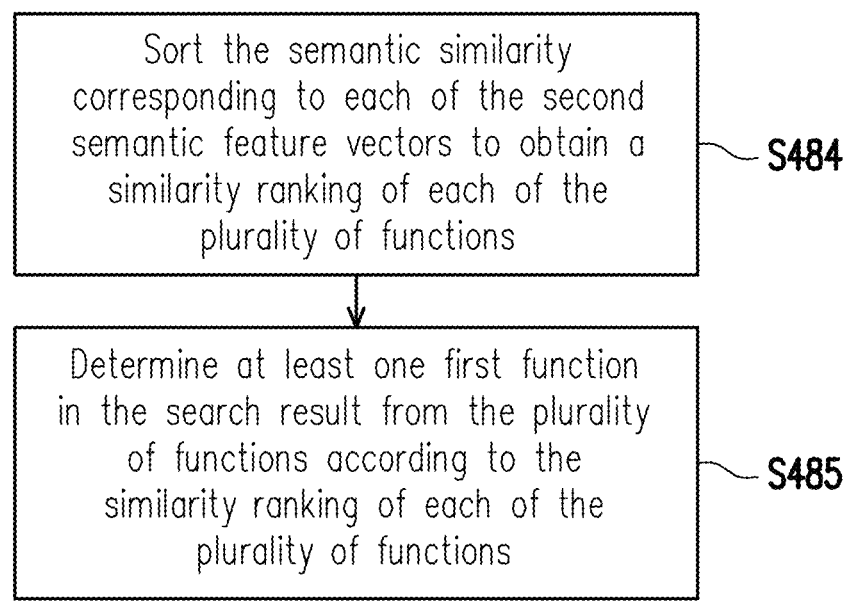
FIG. 6 is a flowchart of determining a search result according to an embodiment of the disclosure.

Referring to FIG. 6, in some embodiments, step S480 may be implemented as steps S484 to S485. In step S484, the processor 140 sorts the semantic similarity corresponding to each of the second semantic feature vectors to obtain the similarity ranking of each of the functions. In other words, the processor 140 may sort the semantic similarity corresponding to all the second semantic feature vectors in the feature vector database from high to low. According to the sorting results of the second semantic feature vectors above, the processor 140 may obtain the similarity ranking of each of the functions. For example, the similarity ranking of each of the functions may be the sorting order of each of the second semantic feature vectors. Alternatively, in some embodiments, the processor 140 may determine the similarity ranking of a certain function according to a plurality of sorting orders corresponding to the plurality of second semantic feature vectors, respectively. For example, the processor 140 may calculate the similarity score of each of the functions according to the plurality of sorting orders for the plurality of second semantic feature vectors of each of the functions, and determine the similarity ranking of each of the functions according to the similarity score of each of the functions.

In step S485, the processor 140 determines at least one first function in the search result from the plurality of functions according to the similarity ranking of each of the functions. For example, the processor 140 may determine to use the X first functions ranked as the top X by similarity as search results.

Finally, in step S490, the processor 140 provides the search result through the display 130. For example, the search result may be a function list, and the display 130 may display the function list including one or more recommended functions that match the search query. In this way, the user may find the desired function from the function list provided by the display 130. For example, Table 3 shows the search result shown on the display 130.

TABLE 3

| Search recommendation list | |
|---|---|
| 1 | function 1 |
| 2 | function 2 |
| 3 | function 3 |

In summary, in the embodiment of the disclosure, the search result of the search query may be determined according to the semantic similarity of the semantic feature vectors, and at least one of the plurality of functions is provided as the search result of the search query. In this way, even if the user does not accurately enter the function name for search, recommended functions that meet the user's expectation may still be found, thereby greatly improving the convenience and flexibility of function search. In addition, since the natural language semantic model may learn semantic correlations between different languages, accurate search results may be obtained by defining a small number of function descriptions in one language. It can be seen that there is no need to set different keywords for different languages in order to optimize keywords in other languages and reduce the amount of data in the database.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A device function search method, adapted for an electronic device having a plurality of functions, the method comprising:
   obtaining a search query through an input device;
   generating a first semantic feature vector of the search query by using a natural language model;
   generating at least one second semantic feature vector of each of the plurality of functions according to at least one function description of each of the plurality of functions by using the natural language model, wherein the plurality of functions are provided by the electronic device for a user to set or operate;
   determining semantic similarity between the first semantic feature vector of the search query and at least one second semantic feature vector of each of the plurality of functions; and
   determining a search result corresponding to the search query according to the semantic similarity between the first semantic feature vector of the search query and the at least one second semantic feature vector of each of the plurality of functions, wherein the search result comprises at least one of the plurality of functions,
   wherein the plurality of functions comprises a first function, and the step of generating the at least one second semantic feature vector of each of the plurality of functions according to the at least one function description of each of the plurality of functions by using the natural language model comprises:
      inputting a first function name of the first function into the natural language model to generate one of the at least one second semantic feature vector of the first function; and
      inputting a second function name of the first function into the natural language model to generate another one of the at least one second semantic feature vector of the first function, wherein the first function name is a first language, and the second function name is a second language.

2. The device function search method according to claim 1, further comprising:
   recording the at least one second semantic feature vector of each of the plurality of functions into a database.

3. The device function search method according to claim 1, wherein the step of generating the at least one second semantic feature vector of each of the plurality of functions according to the at least one function description of each of the plurality of functions by using the natural language model further comprises:
   inputting a function feature string of the first function into the natural language model to generate another one of the at least one second semantic feature vector of the first function.

4. The device function search method according to claim 3, wherein the function feature string of the first function is a first language, and the search query is the first language or a second language, and the first language is different from the second language.

5. The device function search method according to claim 1, wherein the plurality of functions comprises the first function, and the step of determining the search result corresponding to the search query according to the semantic similarity between the first semantic feature vector of the search query and the at least one second semantic feature vector of each of the plurality of functions comprises:
   determining to contain the search result of the first function when the semantic similarity between the first semantic feature vector and the at least one second semantic feature vector of the first function is greater than a preset threshold; and
   determining not to contain the search result of the first function when the semantic similarity between the first semantic feature vector and the at least one second semantic feature vector of the first function is not greater than the preset threshold.

6. The device function search method according to claim 1, wherein the step of determining the search result corresponding to the search query according to the semantic similarity between the first semantic feature vector of the search query and the at least one second semantic feature vector of each of the plurality of functions comprises:
   sorting the semantic similarity corresponding to each of the at least one second semantic feature vector to obtain a similarity ranking of each of the plurality of functions; and
   determining at least one first function in the search result from the plurality of functions according to the similarity ranking of each of the plurality of functions.

7. The device function search method according to claim 1, further comprising:
   establishing an initial natural language model, wherein each of a plurality of weight parameters of the initial natural language model is a floating-point number; and
   quantizing the plurality of weight parameters of the initial natural language model into corresponding integers to obtain the natural language model.

8. The device function search method according to claim 1, before the step of generating a first semantic feature vector of the search query by using the natural language model, the method further comprising:
   translating the search query from the second language to the first language.

9. An electronic device, comprising:
   an input device;
   a storage device, recording a plurality of instructions; and
   a processor, connected to the input device and the storage device, and configured to execute the instructions to:
      obtain a search query through the input device;
      generate a first semantic feature vector of the search query by using a natural language model;
      generate at least one second semantic feature vector of each of a plurality of functions according to at least one function description of each of the plurality of functions by using the natural language model, wherein the plurality of functions are provided by the electronic device for a user to set or operate;
      determine semantic similarity between the first semantic feature vector of the search query and at least one second semantic feature vector of each of a plurality of functions; and
      determine a search result corresponding to the search query according to the semantic similarity between the first semantic feature vector of the search query and the at least one second semantic feature vector of each of the plurality of functions, wherein the search result comprises at least one of the plurality of functions, wherein the plurality of functions comprises a first function,
the processor is configured to execute the instructions to:
input a first function name of the first function into the natural language model to generate one of the at least one second semantic feature vector of the first function; and
input a second function name of the first function into the natural language model to generate another one of the at least one second semantic feature vector of the first function, wherein the first function name is a first language, and the second function name is a second language.

\* \* \* \* \*